Patented Mar. 3, 1953

2,630,434

UNITED STATES PATENT OFFICE 2,630,434

PURIFICATION AND HYDROLYSIS OF ESTERS OF FOLIC ACID

John Ward Greiner, Arthur R. Hanze, Robert V. Kline, Jack L. Richmond, and Kenneth Robert Bedell, Kalamazoo, Mich., assignors to The Upjohn Company, Kalamazoo, Mich., a corporation of Michigan No Drawing. Application April 5, 1951, Serial No. 219,518

9 Claims. (Cl. 260—251.5)

This invention relates to the concurrent separation of dialkyl esters of folic acid from genetic impurities associated therewith, hydrolysis of the purified folic acid ester to folic acid and isolation of the folic acid thus obtained.

Folic acid is a known, physiologically active member of the vitamin B-complex. However its dialkyl esters, represented by the formula:

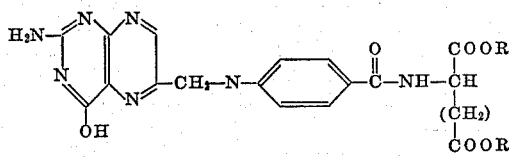

wherein R is an alkyl group having up to and including eight carbon atoms, have relatively little vitamin activity. Accordingly any synthesis of folic acid which proceeds through its dialkyl esters requires, as a necessary step in the process, a hydrolysis of the ester to the free acid. The synthesis of esters of folic acid, being dependent on the condensation of complex acids and pyrimidines, results in the production along with the folic acid esters of various position isomers, oxidation products, unreacted intermediates as well as condensation, polymerization, hydrolysis and degradation products which are herein designated as genetic impurities. Many of these genetic impurities are closely related in structure to the esters of folic acid and would be expected to have similar physical and chemical properties. Before such a crude ester of folic acid can be used it must be purified and hydrolyzed to folic acid of acceptable purity.

It is an object of this invention to provide a concurrent procedure by which a crude dialkyl ester of folic acid can be separated from genetic impurities associated therewith, hydrolyzed to folic acid and folic acid of high purity obtained. It is also an object of this invention to provide a method by which folic acid of improved purity can be obtained in good yield from a crude product containing a dialkyl ester of folic acid and genetic impurities associated therewith. Other objects of this invention will be apparent hereinafter.

It has been found, quite unexpectedly in view of the relatively slight solubility of folic acid in four normal hydrochloric acid at about room temperatures, that dialkyl esters of folic acid are quite soluble in four normal hydrochloric acid at room temperatures while a great part of the genetic impurities associated therewith are not. It has further been found that by allowing a dilute hydrochloric acid solution of a dialkyl ester of folic acid to stand for an appreciable time at room temperatures or below the ester is hydrolyzed to folic acid which can be isolated in good yield and high purity from very dilute acid solution. It is possible to obtain by the method of this invention, starting with a crude dialkyl ester of folic acid, about eighty percent of the folic acid present as material having a purity of eighty percent or more.

In carrying out the method of this invention a dialkyl ester of folic acid and the genetic impurities associated therewith are intimately contacted at about room temperatures with a suitable quantity of four normal hydrochloric acid, whereby most of the ester of folic acid but only a minor part of the genetic impurities are dissolved. The acid solution is separated from the insoluble impurities and the acid concentration suitably reduced. Folic acid of high purity separates from the solution, which is allowed to stand for an appropriate period of time to "age" the precipitate and to allow completion of the hydrolysis and precipitation so that a maximum yield is obtained.

The intimate contacting of the crude ester of folic acid is preferably carried out by adding, at a suitable rate, the crude folic acid ester to a violently agitated four normal hydrochloric acid solution. The time required to dissolve most of the dialkyl ester of folic acid is dependent on the fluidity of the crude ester, the violence of the agitation and the ratio of the volume of acid used to the weight of ester. When about 25 parts of four normal hydrochloric acid per part of folic acid ester is used in conjunction with efficient agitation a contact time of from about fifteen minutes to about two hours is satisfactory. When about 200 parts of acid per part of folic acid is used the contact time can be somewhat shorter. For reasons of convenience and economy as much folic acid ester as possible should be dissolved in the four normal hydrochloric acid with a ratio of about 25 parts to 200 parts of four normal hydrochloric acid per part of folic acid ester being preferred. When less acid is used complete extraction becomes difficult while the use of more than about 200 parts of acid per part of ester does not contribute to the ease of extraction. Usually the insoluble residue remaining after the extraction of the folic acid ester is so difficult to separate from the solution, particularly when filtration is used, that a filter aid is preferably added near the end of the extraction period prior to filtration. As is most generally the situation when a filter aid and a tarry residue are removed an appreciable amount of solvent and product remain occluded to the filter cake so that a second extraction of the filter aid residue is desirable so that as nearly a complete recovery of product as possible can be obtained. This is particularly true when, as in the present instance, the desired product is sufficiently costly to more than justify the additional processing expense. In addition to the filter aid, activated carbon can be added to the acid solution whereby some decolorization of the usually very dark soltuion is obtained. However since most of the dissolved impurities are more soluble in the later processing steps than is folic acid the addition of activated carbon is optional, not essential.

As previously mentioned the concentration of the hydrochloric acid solution, after removal of the insoluble material, is suitably reduced and the solution allowed to stand for an appropriate period of time to "age" the precipitate and complete the hydrolysis and precipitation so that a maximum recovery of folic acid can be obtained. The reduction in concentration of the hydrochloric acid to suitable concentrations can be accomplished by dilution with water, neutralization with alkali or preferably by a combination of both dilution and neutralization. While folic acid is quite insoluble in dilute hydrochloric acid solutions and will precipitate, in part at least, from hydrochloric acid solutions containing widely varying quantities of folic acid it has been found that a product having preferred physical properties, such as particle size, filtration characteristics and commercial acceptability is obtained when the folic acid precipitates from solutions containing from about two to about ten parts of folic acid per 1000 parts of solution. When about twenty parts of folic acid ester is dissolved in about 1000 parts of four normal hydrochloric acid the reduction in acid concentration is preferably accomplished by the addition of about three volumes of water, which reduces the hydrochloric acid concentration to about one normal and the folic acid concentration to about six parts per 1000, followed by the addition of sufficient aqueous sodium hydroxide solution to reduce the acid concentration to from about 0.05 to about 0.4 normal. After reduction of the acid concentration the solution, from which a part of the folic acid has already precipitated, is allowed to stand for from about twelve to about forty-eight hours to obtain the advantageous results already mentioned.

Among the di-lower alkyl esters of folic acid which can be used in the method of the present invention are the dimethyl ester of folic acid, the diethyl ester of folic acid, the diisopropyl ester of folic acid, the di-n-butyl ester of folic acid, the diisoamyl ester of folic acid and the diisooctyl ester of folic acid.

The di-lower alkyl esters of folic acid which are used in the method of the present invention can be prepared in several ways, such as, by the direct esterification of crude folic acid with the appropriate anhydrous alcohol and hydrogen chloride as described by B. L. Hutchings et al., J. A. C. S. 70, 1 (1948), or by the splitting of a sulfonamide of the formula:

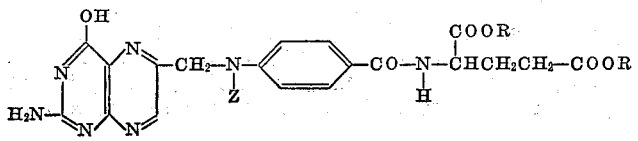

wherein Z is a arylsulfonyl radical and R is a lower alkyl radical, with hydrogen bromide and a bromine acceptor in a lower aliphatic acid to form a di-lower alkyl ester of folic acid.

The reaction is accomplished conveniently and easily by mixing an arylsulfonamide, hydrogen bromide and a bromine acceptor in an aliphatic acid medium and allowing the mixture to stand. The reaction usually proceeds at ordinary room temperature, although in some cases slowly, and is generally accomplished at from zero degrees to about 100 degrees centigrade. The reaction is usually substantially complete in from one to several hours and the folic ester which is present in the mixture as its hydrobromide can then be separated from the mixture in any one of several ways. One convenient way of separating the folic ester consists in mixing the reaction mixture with sufficient ether to precipitate the amine hydrobromide. The amine hydrobromide can then be recovered by filtering the mixture. The hydrobromide can then, if desired, be treated with an alkali, such as, aqueous sodium bicarbonate, potassium carbonate, or the like to free the amino ester. However, if desired, the folic ester hydrobromide can be used in the method of the present invention. Alternatively the excess hydrogen bromide and aliphatic acid solvent can be removed under reduced pressure to obtain the folic ester hydrobromide as a viscous oil which is suitable as starting material for the method of this invention.

The aryl sulfonamides which can be used in the preparation of the starting materials of the present invention can be prepared by allowing a 2,4,5-triamino-6-hydroxypyrimidine to react with an N-(2-ketopropyl)-p-aminobenzoylglutamate of the formula:

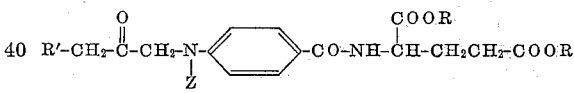

wherein R and Z have the values previously assigned and R' is a halogen.

The reaction is usually accomplished by mixing the 2,4,5-triamino-6-hydroxypyrimidine and the N - (2 - ketopropyl) - p - aminobenzoylglutamate compound in a liquid medium, such as glacial acetic acid, and allowing the mixture to stand for several hours. The reaction can be carried out at room temperature, although the reaction mixture can be warmed somewhat or even cooled, if desired. Although the preferred reaction medium is glacial acetic acid, other suitable liquid media, such as propionic or valeric acids, alcohols, glycols, polyglycols, N-methylacetanilide and the like can be used, if desired. It is frequently found to be of advantage to include sodium acetate in the reaction mixture.

The 2,4,5-triamino-6-hydroxypyrimidine and the N-(2-ketopropyl)-p-aminobenzoylglutamate compound are generally used in approximately equimolecular proportions.

Following the reaction period, the arylsulfonamide can be recovered from the reaction mixture in any convenient way such as distilling off the aliphatic acid solvent under reduced pressure leaving the N'-(N-(2-amino-4-hydroxy-6- pteridyl)methyl)-p-aminobenzoylglutamate as a solid or viscous liquid which is generally of sufficient purity for most uses.

One convenient way of preparing an N-(2-ketopropyl) - p - aminobenzoylglutamate compound consists in first allowing a glutamic ester compound of the formula:

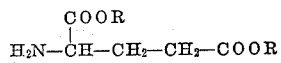

wherein R has the value previously given, with an arylsulfonylaminobenzoyl halide in the presence of a hydrogen halide acceptor, such as pyridine to form an N'-(arylsulfonyl-p-aminobenzoyl)-glutamate compound of the formula:

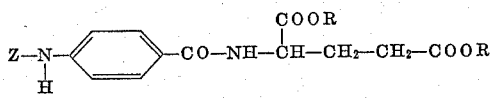

wherein R and Z have the values previously given.

The arylsulfonamides thus formed can then be condensed with an epihalohydrin to form an N - (3 - halo - 2 - hydroxypropyl) - p - aminobenzoylglutamate compound of the formula:

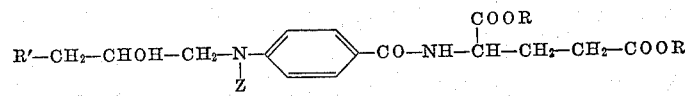

wherein R' represents halogen.

These hydroxypropyl compounds can then be oxidized with chromic anhydride in glacial acetic acid at about fifteen degrees centigrade to form N - (2 - ketopropyl) - p - aminobenzoylglutamate compounds of the formula:

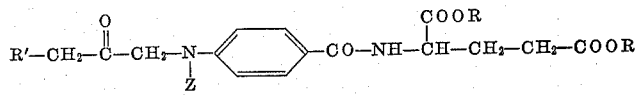

wherein R, R' and Z have the values previously assigned.

Certain advantages of the invention are apparent from the following examples which are given by way of illustration only and are not to be construed as limiting.

*Example 1. — Diethyl N'-(p-toluenesulfonyl-p-aminobenzoyl)-1-glutamate*

A mixture of 407 grams of p-toluenesulfonyl-p-aminobenzoic acid and 3,450 milliliters of toluene was dried by distilling the mixture until 350 milliliters of distillate had been collected. A few drops of pyridine and 50 milliliters of thionyl chloride were then added to the dry toluene solution and the mixture stirred and refluxed for one-half hour. The solution was then cooled with agitation for two hours and the solid which precipitated was recovered by filtering and washing with toluene and then with mixed hexanes and drying. There was thus obtained 387 grams of p-toluenesulfonyl-p-aminobenzoyl chloride melting at 141 degrees to 142 degrees centigrade.

A mixture of 48 grams of diethyl 1(+)-glutamate hydrochloride, 68 grams of p-toluenesulfonyl-p-aminobenzoyl chloride, 19 grams of magnesium oxide, 250 milliliters of ethylene dichloride and 100 milliliters of water was stirred with cooling for about 4 hours. The mixture was filtered and the organic layer was separated from the filtrate and washed successively with water, ice cold dilute hydrochloric acid, water and dilute aqueous sodium bicarbonate. The washed organic layer was then dried and diluted with mixed hexanes until slightly turbid and allowed to crystallize. Upon filtering the mixture, there was obtained 78 grams of diethyl N'-(p-toluenesulfonyl-p-aminobenzoyl)-1-glutamate melting at 125 degrees to 126 degrees centigrade and having a specific rotation of $(\alpha)_D^{25}=-13.2$ degrees in a mixture of 5 percent methanol and 95 percent ethanol.

*Example 2.—Diethyl N'-(N-(3-chloro-2-hydroxypropyl) - p - toluenesulfonyl - p - aminobenzoyl)-glutamate*

A mixture of 2.85 grams of diethyl N'-(p-toluenesulfonyl-p-aminobenzoyl)-glutamate and 1.1 grams of epichlorohydrin was agitated at 135 degrees centigrade. Two drops of pyridine were added and agitation at 135 degrees centigrade was contained for five minutes. The excess epichlorohydrin was volatilized under reduced pressure. The residue which consisted of diethyl N'-(N - (3 - chloro - 2 - hydroxypropyl) - p - toluenesulfonyl - p - aminobenzoyl) - glutamate was used in subsequent experiments without further purification. Diethyl N'-(N-(3-bromo-2-hydroxypyropyl) - p - toluenesulfonyl - p - aminobenzoyl)-glutamate is prepared in similar fashion using epibromohydrin instead of epichlorohydrin.

Ethyl N - (3 - chloro - 2 - hydroxypropyl) - p-toluenesulfonyl - p - aminobenzoate and N - (3-chloro - 2 - hydroxypropyl) - p - toluenesulfonyl-p-aminobenzoic acid are prepared in similar manner using ethyl p-toluenesulfonyl-p-aminobenzoate and p-toluenesulfonyl-p-aminobenzoic acid, respectively, instead of N'-(p-toluenesulfonyl-p-aminobenzoyl)-glutamate.

*Example 3.—Diethyl N' - (N - (3 - chloro - 2-ketopropyl) - p - toluenesulfonyl - p - aminobenzoyl)-glutamate*

The oily diethyl N'-(N-(3-chloro-2-hydroxypropyl) - p - toluenesulfonyl - p - aminobenzoyl)-glutamate prepared from 2.85 grams of diethyl N' - (p - toluenesulfonyl - p - aminobenzoyl)-glutamate and an excess of epichlorohydrin was dissolved in 10 milliliters of glacial acetic acid. A mixture of 0.8 gram of chromic anhydride, 18 milliliters of glacial acetic acid and 1 milliliter of water was added slowly with stirring and cooling. The mixture was allowed to stand at room temperature for twelve hours and the acetic acid then volatilized under reduced pressure. The residue was taken up in a mixture of water and ether and the layers separated. The ether layer was washed with water until the washings were no longer green and then treated with charcoal and dried over anhydrous magnesium sulfate. Upon distillation of the ether, there remained diethyl N' - (N - (3 - chloro - 2 - ketopropyl) - p-toluenesulfonyl-p-aminobenzoyl)-glutamate as a pale yellow viscous oil.

Ethyl N-(3-chloro-2-ketopropyl)-p-toluenesulfonyl-p-aminobenzoate and N-(3-chloro-2-ketopropyl)-p-toluenesulfonyl - p - aminobenzoic acid are prepared in similar fashion using ethyl N-(3-chloro-2-hydroxypropyl)-p-toluenesulfonyl-p-aminobenzoate and N-(3-chloro-2-hydroxypropyl)-p-toluenesulfonyl-p-aminobenzoic acid, respectively, instead of diethyl N'-(N-(3-chloro-2-hydroxypropyl)-p-toluenesulfonyl-p-aminobenzoyl)-glutamate.

*Example 4.— Diethyl N'-(N-((2-amino-4-hydroxy-6-pteridyl)methyl)-p-toluenesulfonyl-p-aminobenzoyl)-1-glutamate*

Four hundred milligrams of diethyl N'-(N-(3-chloro-2-ketopropyl)-p-toluenesulfonyl-p-aminobenzoyl)-1-glutamate was added to a mixture of 100 milligrams of 2,4,5-triamino-6-hydroxypyrimidine, 120 milligrams of sodium acetate, 50 milligrams of potassium iodide and 15 milliliters of glacial acetic acid. The mixture was allowed to stand at room temperature for about one hour and then heated for 25 minutes on the steam bath. After standing overnight open to the air, the acetic acid was distilled at 50 degrees centigrade under reduced pressure. The residue, after washing free of inorganic salts, contained a large proportion of diethyl N'-(N-((2-amino-4-hydroxy-6-pteridyl)methyl)-p-toluenesulfonyl-p-aminobenzoyl)-1-glutamate.

Ethyl N-((2-amino-4-hydroxy-6-pteridyl)-methyl-p-toluenesulfonyl-p-aminobenzoate and N-((2-amino-4-hydroxy-6-pteridyl)methyl)-p-toluenesulfonyl-p-aminobenzoic acid are prepared in similar manner using ethyl N-(3-chloro-2-ketopropyl)-p-toluenesulfonyl-p-aminobenzoate and N-(3-chloro-2-ketopropyl)-p-toluenesulfonyl-p-aminobenzoic acid, respectively, instead of diethyl N'-(N-(3-chloro-2-ketopropyl)-p-toluenesulfonyl-p-aminobenzoyl)-1-glutamate.

*Example 5.—Cleavage of diethyl N'-(N-((2-amino-4-hydroxy-6-pteridyl)-methyl)-p-toluenesulfonyl-p-aminobenzoyl)-glutamate*

Crude diethyl N'-(N-((2-amino-4-hydroxy-6-pteridyl)methyl-p-toluenesulfonyl-p-aminobenzoyl)-glutamate was dissolved in 3.5 milliliters of a 26 percent solution of hydrogen bromide in glacial acetic acid containing 0.13 gram of phenol. The mixture was stirred at room temperature for 1.5 hours and then stirred with 30 milliliters of anhydrous ether. The resulting mixture was filtered and the precipitate washed thoroughly with ether and dried in vacuo for several hours.

The dry precipitate consisting of crude diethyl N'-(N-((2-amino-4-hydroxy-6-pteridyl)methyl)-p-aminobenzoyl)-glutamate was hydrolyzed to form crude N'-(N-((2-amino-4-hydroxy-6-pteridyl)methyl)-p-aminobenzoyl)-glutamic acid. The free acid, upon micro-biological assay with *Streptococcus fecalis R* and with *Lactobacillus casei* had an activity of 44 percent of that of the pure acid isolated from natural sources.

*Example 6.—Purification of folic acid with four normal hydrochloric acid and activated carbon*

A mixture of 270 milliliters of four normal hydrochloric acid, 75.3 grams of crude diethyl ester of folic acid activity, which was shown by chemical assay to contain ten grams of folic acid, and ten grams of activated carbon (Norite A) was stirred vigorously for fifteen minutes, five grams of a filter aid (Celite 545) was added and the mixture filtered through a bed of the same filter aid. The filter cake was extracted twice by vigorously stirring the cake with two 105-milliliter portions of four normal hydrochloric acid for five minutes each followed by filtration. The filtrates were combined, diluted with 1440 milliliters of water at about 35 degrees centigrade to form approximately a one normal solution with respect to hydrochloric acid and allowed to stand at about zero degrees centigrade for two days. The resulting crystalline precipitate was filtered off and dried to obtain 4.42 grams of material which assayed 90.4 percent folic acid (forty percent recovery).

*Example 7.—Purification of folic acid without activated carbon*

A mixture of 270 milliliters of four normal hydrochloric acid and 75.3 grams of crude diethyl ester of folic acid activity, which was shown to contain 10 grams of folic acid as determined by chemical assay, was stirred vigorously for fifteen minutes, five grams of filter aid (Celite 545) was added and the mixture was filtered through a bed of the same filter aid. The filter cake was then extracted by stirring it vigorously for five minutes each with two 125 milliliter portions of four normal hydrochloric acid followed by filtration. The filtrates were then combined, diluted with 1560 milliliters (three volumes) of water at 35 degrees centigrade and allowed to stand at about zero degrees centigrade for two days. The crystalline precipitate which had formed was filtered off and dried to obtain 4.98 grams of material which assayed 87.9 percent folic acid (43.8 percent recovery).

*Example 8.—Purification of folic acid by dilution coupled with partial neutralization*

About 200 kilograms of crude diethyl ester of folic acid which was shown to contain 32.85 kilograms of folic acid activity by chemical assay was added at a uniform rate over a period of one and one-quarter hours with rapid stirring to 217 gallons of four normal hydrochloric acid, 72.6 pounds of decolorizing charcoal (Norite A) was then added, agitation continued for an additional forty minutes, 36 pounds of filter aid (Celite 545) was added and stirring continued for five minutes.

The mixture was then divided into two parts, filtered and the filtrates combined. Each filter cake was thoroughly washed with 66 gallons of four normal hydrochloric acid, filtered, washed again with fifty gallons of four normal hydrochloric acid, filtered and the filtrates combined. The combined filtrates (465 gallons) were divided into two equal portions, each diluted with 545 gallons of water to form approximately a one normal solution of hydrochloric acid and then partially neutralized with 191 pounds of sodium hydroxide dissolved in forty gallons of water to give an approximately 0.4 normal solution with respect to hydrochloric acid. The 0.4 normal solutions were then cooled to about fifteen degrees centigrade for twelve hours, three degrees centigrade for two days and then filtered. The filter cakes were then washed with three twenty-gallon portions of water and dried by suction. Assay of the wet cake showed that it contained 20.3 kilograms of folic acid (61.7 percent recovery).

*Example 9.—Isolation of folic acid by dilution coupled with partial neutralization*

Eight and four-tenths kilograms of crude diethyl ester of folic acid prepared as described in Example 5 which contained 978 grams of folic acid activity as determined by chemical assay, some hydrogen bromide, acetic acid, and other impurities were added at a uniform rate over a period of one hour to 68.1 pounds of violently stirred four normal hydrochloric acid, 4.8 pounds of decolorizing charcoal (Norite A) was added, the stirring continued for about thirty minutes, 2.4 pounds of filter aid (Celite 545) was added and the mixture filtered, 25 minutes being required for the complete filtration. The filter cake was extracted by stirring it with two 33.5-pound portions of four normal hydrochloric acid followed by filtration. The filtrates were combined (14.5 gallons), diluted with 78 gallons of water to form approximately a one normal solution with respect to hydrochloric acid and then partially neutralized by the addition of 22.3 pounds of sodium hydroxide dissolved in 5.1 gallons of water, to give a solution having an acid concentration about 0.1 normal with respect to the acid present which was then cooled to about three degrees centigrade for twelve hours, filtered and the filter cake dried to obtain 950 grams of material which assayed 80.2 percent folic acid (78 percent recovery).

In a manner essentially as described folic acid of greatly increased purity can also be obtained from crude dimethyl, dibutyl or diisooctyl esters of folic acid.

We claim:

1. A process for the concurrent separation of a di-lower alkyl ester of folic acid from genetic impurities associated therewith, hydrolysis of the ester to folic acid and isolation of folic acid of high purity comprising: intimately contacting a crude di-lower alkyl ester of folic acid with hydrochloric acid having a concentration of about four normal, whereby the di-lower alkyl ester of folic acid and only a portion of the associated impurities are dissolved, separating the hydrochloric acid solution of the folic acid ester from the insoluble material, decreasing the hydrochloric acid concentration to less than one-half normal by dilution with water and partial neutralization with alkali and allowing the solution to stand for an appreciable period of time whereby the di-lower alkyl ester of folic acid is converted to folic acid which precipitates from the solution with only a minor portion of the impurities associated therewith in the solution, and recovering the precipitated folic acid of improved purity thus obtained.

2. A process for the concurrent separation of a di-lower alkyl ester of folic acid from genetic impurities associated therewith, hydrolysis of the ester to folic acid and isolation of folic acid of high purity comprising: intimately contacting one part of a di-lower alkyl ester of folic acid and its associated impurities with from about 25 to 200 parts of aqueous hydrochloric acid having a concentration of about four normal per part of folic ester until substantially all of the di-lower alkyl ester of folic acid has dissolved in the hydrochloric acid, separating the acid solution from the acid-insoluble material, reducing the acid concentration to less than one normal with respect to the hydrochloric acid by dilution with water and partial neutralization with alkali, allowing the solution to stand for from about 12 to 48 hours whereby the di-lower alkyl ester of folic acid hydrolyzes to folic acid which precipitates, and recovering the folic acid of improved purity thus precipitated.

3. The method of claim 2 wherein the di-lower alkyl ester of folic acid is contacted with approximately four normal hydrochloric acid solution for from fifteen minutes to two hours.

4. A process for the concurrent separation of a di-lower alkyl ester of folic acid from genetic impurities associated therewith, hydrolysis of the ester to folic acid and isolation of folic acid of high purity comprsing: contacting an impure di-lower alkyl ester of folic acid with aqueous hydrochloric acid having a concentration of about four normal, whereby the di-lower alkyl ester of folic acid and only a portion of the associated impurities are dissolved, separating the acid solution from the insoluble material, decreasing the acid concentration to less than one normal by diluting the acid solution with about three volumes of water and partially neutralizing the hydrochloric acid with sodium hydroxide, allowing the solution to stand for an appreciable length of time whereby the di-lower alkyl ester of folic acid is converted to folic acid which precipitates from the solution, and recovering the precipitated folic acid.

5. A process for the concurrent separation of a di-lower alkyl ester of folic acid from genetic impurities associated therewith, hydrolysis of the ester to folic acid and isolation of folic acid of high purity comprising: intimately contacting a crude di-lower alkyl ester of folic acid with from about 25 to 50 parts of about four normal hydrochloric acid per part of ester of folic acid until substantially all of the ester of folic acid has dissolved, separating the acid solution from the insoluble material, decreasing the acid concentration to about one normal by the addition of about three volumes of water, further decreasing the acid concentration to between 0.05 and 0.4 normal by the addition of aqueous sodium hydroxide, allowing the solution to stand for from about twelve to 48 hours whereby the folic ester hydrolizes to folic acid which precipitates, and recovering the folic acid of improved purity thus precipitated.

6. The process of claim 5 wherein the di-lower alkyl ester is the diethyl ester of folic acid.

7. The method of claim 5 wherein the hydrochloric acid concentration is decreased to about 0.1 normal.

8. In a process for the conversion of a crude di-lower alkyl ester of folic acid to folic acid having an improved purity the step of intimately contacting crude di-lower alkyl ester of folic acid with about four normal hydrochloric acid whereby the folic acid ester is preferentially dissolved.

9. A process for the concurrent separation of a di-lower alkyl ester of folic acid from genetic impurities associated therewith, hydrolysis of the ester of folic acid and isolation of folic acid of high purity comprising: slowly addng a crude di-lower alkyl ester of folic acid to a strongly agitated four normal solution of hydrochloric acid, continuing the agitation until substantially all of the folic acid ester has dissolved, separating the acid solution from the insoluble material, decreasing the acid concentration to about one normal with respect to hydrochloric acid by the addition of about three volumes of water, further decreasing the acid concentration to about 0.1 normal with respect to hydrochloric acid by the addition of aqueous sodium hydroxide, allowing the solution to stand for from about twelve to 48 hours, and recovering the folic acid of increased purity which has precipitated.

JOHN WARD GREINER.
ARTHUR R. HANZE.
ROBERT V. KLINE.
JACK L. RICHMOND.
KENNETH ROBERT BEDELL.

No references cited.